United States Patent [19]

Adamo

[11] 3,728,581
[45] Apr. 17, 1973

[54] GROUND FAULT CIRCUIT INTERRUPTER

[76] Inventor: Daniel M. Adamo, 125 E. Crescent Avenue, Redlands, Calif. 92373

[22] Filed: May 27, 1971

[21] Appl. No.: 147,516

[52] U.S. Cl. ............317/18 A, 317/13 R, 317/40 A, 340/255
[51] Int. Cl. ...............................................H02h 3/16
[58] Field of Search ................317/18 A, 40 A, 13 R; 340/255

[56] References Cited

UNITED STATES PATENTS

| 3,171,062 | 2/1965 | Rowe | 317/18 A |
| 3,562,588 | 2/1971 | Zielasko | 317/18 A |
| 3,402,326 | 9/1968 | Guasco et al. | 317/18 A |

FOREIGN PATENTS OR APPLICATIONS

| 599,173 | 6/1934 | Germany | 317/18 A |

Primary Examiner—James D. Trammell
Attorney—Herbert E. Kidder

[57] ABSTRACT

A ground fault circuit interrupter and/or indicator comprising a relay switch and/or indicator lamp connected on one side to the grounded frame of an appliance or other part, and on the other side to the neutral wire or to the grounding wire of the electrical service. Current leaking from the hot line to the appliance frame due to moisture or faulty insulation passes through the relay coil and/or indicator to the neutral line or grounding wire of the service, and this actuates the relay switch to open the hot line circuit to the appliance. In one embodiment, there is an additional circuit breaker in the hot line comprising a relay switch serially connected to the hot line, which is energized by excessive current flow, as in a line-to-line short.

3 Claims, 6 Drawing Figures

PATENTED APR 17 1973

INVENTOR.
DANIEL M. ADAMO
BY Herbert E. Fidder
AGENT

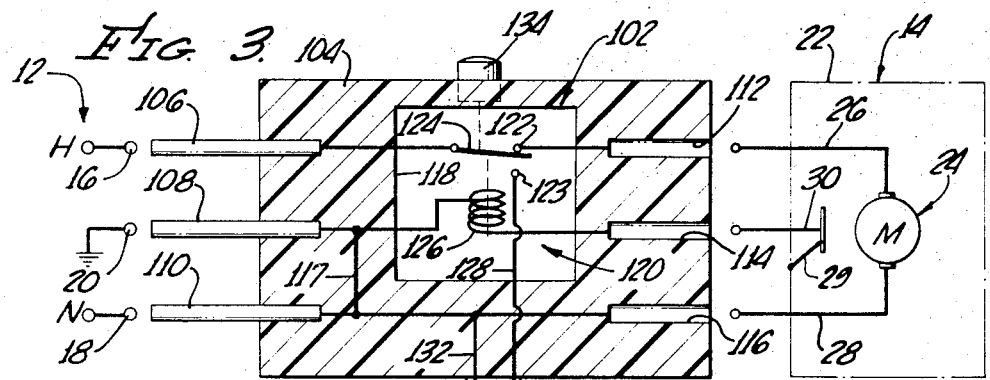
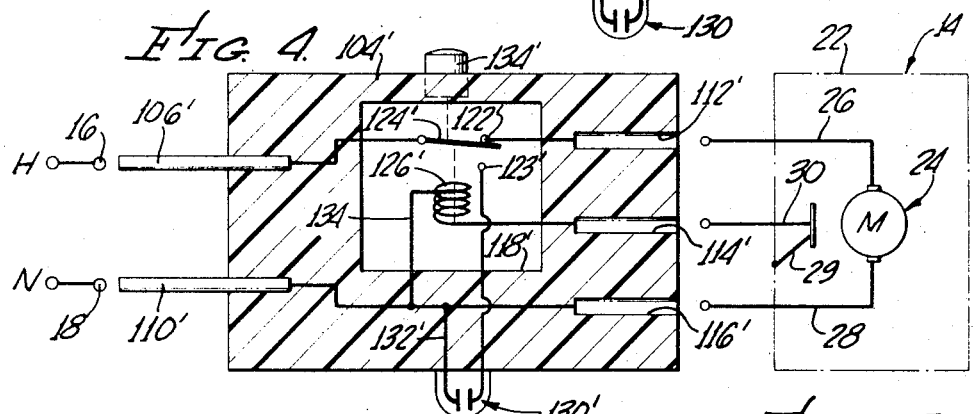
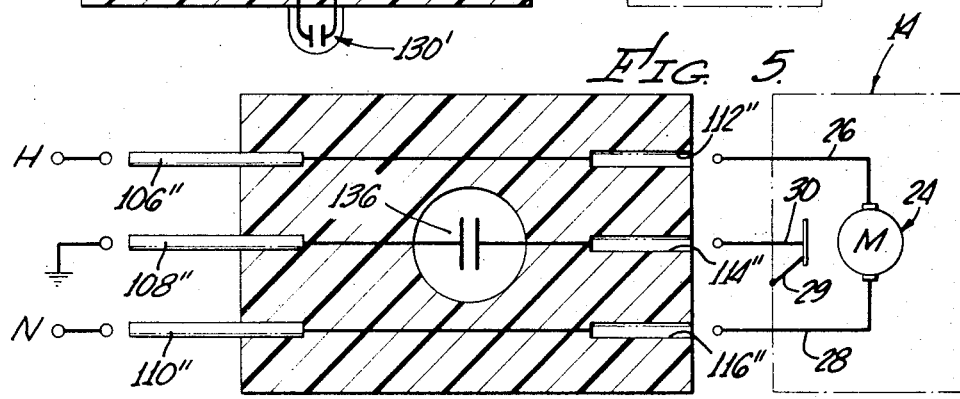
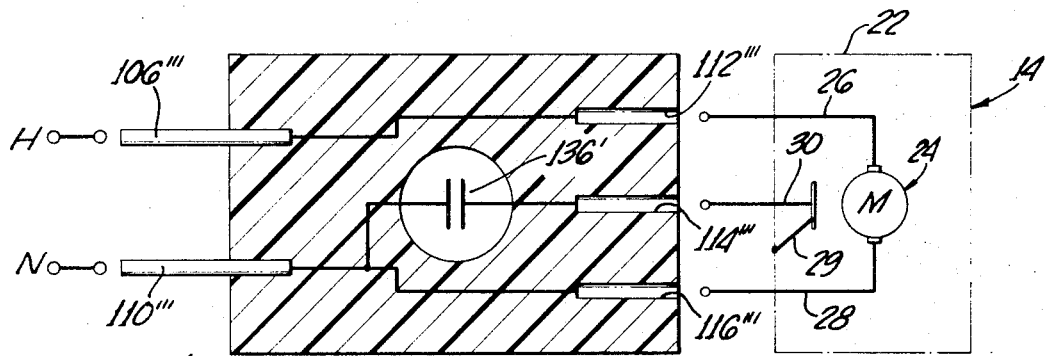

GROUND FAULT CIRCUIT INTERRUPTER

BACKGROUND OF THE INVENTION

The present invention relates generally to circuit interrupters, and more particularly to a device for detecting the existence of current leakage from the "hot" line to the frame of an appliance or other part, having an electrical connection to the grounding wire of the service, and which functions to open the hot line circuit so that the appliance frame is no longer electrified. Current leakage of the type referred to may be caused by moisture or defective insulation, particularly in motor coils, and may cause the appliance frame to be electrified even though the on-off switch of the appliance may be turned off. If the grounding connections should be inadequate due to corrosion of the connections, oxidation of the water pipes, excessive dryness of the soil, or any other cause, this results in an extremely dangerous condition, wherein a person may be electrocuted by touching the frame while in contact with a grounded, or return conductor.

The danger is caused by the fact that grounding appliance frames to the neutral conductor of the electrical service, as required by the electrical codes, provides a readily available link between a live circuit and an earth ground at any point where a ground connection is available. The basic purpose of grounding appliances is to keep all normally accessible metal parts at or near ground potential, to that there is never any appreciable voltage between the metal parts and the earth, or other objects connected directly to the earth.

The major advantage of grounding appliances is that grounding is supposed to prevent persons from receiving a shock from an appliance that is effectively grounded, unless they contact a part intended to carry current and a grounded surface. However, grounded appliances enlarge the area and the locations at which persons can establish electrical contact with the earth. This increases probability of shock from accidental contact with a live part, and increases probability of shock from contact with an ungrounded metal part of an old ungrounded appliance that has developed a fault which causes the frame of the appliance to be electrically "hot."

The major problem associated with grounding of appliances is that a large number of homes are not equipped with three-prong grounded receptacles, and therefore most customers who buy a new grounded appliance are faced with an installation problem. Oftentimes, the customer solves the problem by breaking off the ground plug, which defeats the grounding system. This produces an extremely hazardous condition, because of the electrical interconnection of all dead metal parts within the appliance which causes the entire appliance to be electrified if there should be a short or other electrical leakage within the motor. If a person were to touch an appliance having a circuit fault of the type mentioned, while in contact with a water pipe or gas pipe, he would receive, at the very least, a serious electrical shock and possibly be electrocuted. Service men, in particular, are apt to be endangered while working on grounded appliances that are not properly connected to the grounding wire of the service line, or while working on grounded appliances that have developed a hot-line-to-frame short. In the case of an appliance having a hot-line-to-frame short, the service man may find that a motor or other electrical component burns out before he can ascertain where and what the trouble is, with the result that the customer is faced with considerable added expense to repair damage that occurs after the service man has started to work on the appliance.

SUMMARY OF THE INVENTION

The primary object of the invention is to provide a new and improved ground fault circuit interrupter, that will automatically indicate the existence of a ground fault (i.e., hot-line-to-frame short) in any electrical appliance or circuit, either a.c. or d.c., and instantaneously opens the circuit of the hot line, thereby stopping the current leakage to prevent any damage to the circuit or injury to any person in contact with the appliance frame and the ground.

Another object of the invention is to provide a device of the class described, which additionally includes a circuit breaker that opens the circuit of the hot line responsive to an excessive current flow, as when there is a direct line-to-line short in the system.

A further object of the invention in one of its embodiments is to provide a ground fault circuit interrupter of the class described which is contained within a plug connected between the service line and the appliance; said plug being either a three-prong and three-socket device for connecting a grounded appliance to a three-conductor service line having a grounding wire, or a two-prong and three-socket device for connecting a grounded appliance to a two-conductor service line having no grounding wire.

Still a further object of the invention in another of its embodiments is to provide a simple plug-in device that can be connected between the service line and the appliance, which indicates the presence of a ground fault without interrupting the circuit of the hot line; said device being either a three-prong three-socket unit or a two-prong three-socket unit, so as to permit connection of a grounded appliance to either a three-conductor or two-conductor service line.

These and other objects and advantages of the present invention will become apparent to those skilled in the art from a consideration of the following detailed description of certain illustrative embodiments thereof, with reference to the accompanying drawings.

BRIEF DESCRIPTION OF THE DRAWINGS

FIG. 1 is a schematic drawing of a ground fault circuit interrupter embodying the principles of the invention;

FIG. 2 is a similar drawing of another embodiment of the invention having a circuit interrupter for the hot line which is actuated by an overload current; as when there is a direct line-to-line short;

FIG. 3 is a schematic drawing of a third form of the invention, consisting of a plug-in ground fault circuit interrupter for connection between a grounded appliance and a three-conductor service line having a grounding wire;

FIG. 4 shows a plug-in device similar to that shown in FIG. 3, but adapted for connection between a grounded appliance and a two-conductor service line having no grounding wire;

FIG. 5 shows a simplified version of the invention, consisting of a ground fault indicator, without the circuit interrupter, in a plug-in device adapted for connection between a grounded appliance and a three-conductor service line; and FIG. 6 shows a plug-in device similar to that shown in FIG. 5, but adapted for connection between a grounded appliance and a two-conductor service line.

DESCRIPTION OF THE PREFERRED EMBODIMENTS

In FIG. 1 of the drawings, the ground fault circuit interrupter of the invention is designated in its entirety by the reference numeral 10, and is adapted to be connected between a three-conductor grounded electrical service 12 and a grounded appliance 14. The service 12 comprises a "hot line" 16, neutral line 18, and grounding wire 20. Electrical codes require that the neutral line 18 be connected to the grounding wire 20, and that the grounding wire be connected to the water pipes or to a grounding rod buried deeply in the soil. Appliance 14 comprises a frame 22, motor (or other electrical circuit) 24, and electrical conductors 26,28 and 30. Conductor 26 is the hot line conductor; 28 is the neutral line conductor; and 30 is the grounding wire conductor. All metal parts in the appliance are grounded to the frame 22, and the frame is electrically connected at 29 to the grounding wire conductor 30.

The ground fault circuit interrupter 10 may be built into the appliance 14, or it may be an entirely separate unit as shown in the drawing, in which case the circuit will be enclosed within a housing 32 and have one set of conductors 34, 36 and 38 connected to service lines 16,18 and 20, respectively, and another set of conductors 40 and 42 connected to appliance lines 26 and 30, respectively. Conductor 36 passes directly through the housing and is connected at its other end to the appliance neutral line 28. The housing 32 is electrically connected at 43 to the grounding conductor 38.

Contained within the housing 32 are two relay switches 44 and 46. Relay switch 44 has an electromagnet coil 48, which is connected at one end to hot line conductor 34, and at the other end to a wire 50. Wire 50 is fused at 52 and is connected to one end of a load-limiting resistor 54, the other end of which is connected to the movable contact member 56 of a single pole double throw relay switch 46. Contact member 56 is normally closed to a stationary contact 58, which is connected to hot line conductor 40 going to the appliance 14. Contact 56 of relay 46 is movable from contact 58 to a second contact 59 by an electromagnet coil 60, one end of which is connected to grounding wire conductor 38, while the other end is connected to the grounding wire conductor 42 going to the appliance. Switch contact 59 is connected by a wire 61 to an indicator lamp 62 which is connected, in turn, to the neutral conductor 36. Thus, when switch member 56 is closed to contact 59, the lamp 62 is lighted up.

In relay switch 44, the electromagnet coil 48 is operatively connected to a movable switch member 64, and moves the same between open and closed positions with respect to stationary contact 66. Switch member 64 is connected to hot line conductor 34, and stationary contact 66 is connected by a line 68 to wire 42. Also connected to contact 66 is a wire 69 going to neutral conductor 36, and serially connected into the wire is an indicator lamp 70.

The operation of this embodiment of the invention is as follows: During normal operation of the appliance 14, when everything is in good working order, electrical current to operate the motor 24 passes from hot line 26 to neutral line 28, and there is no current passing through the grounding wire 30. Current passes from the service hot line 16 through conductor 34, coil 48, fuse 52, resistor 54, contacts 56 and 58 of relay switch 46, and via conductor 40 to the appliance hot line 26. At the same time, the return circuit carries current from neutral line 28, through conductor 36 to the neutral service line 18. Since there is no current passing through the appliance grounding wire 30, there is no current passing through those parts of the circuit interrupter which connect line 42 to line 38. With no current passing through lines 42 and 68 the indicator lamps 62 and 70 remain dark.

However, in the event that moisture or faulty insulation causes current to leak from hot line 26 to the frame 22 of the appliance, the following happens: Current passes through grounding wire 30 of the appliance to conductor 42, through electromagnet coil 60 to conductor 38, and thence to the grounding wire conductor 20 of the service line. At the same time, part of the current in conductor 42 is shunted through lines 68, 69 and lamp 70, to neutral conductor 36, thereby causing lamp 70 to light up. Current passing through coil 60 energizes the latter, causing switch member 56 to be pulled away from contact 58, and into engagement with contact 59. As a result, the circuit from the hot line 16 to the appliance 14 is opened, and this immediately stops the electrical leakage, as the appliance 14 is then effectively cut off from all electricity. At the same time, lamp 62 is lighted up and remains lighted, notifying the repairman that a ground fault has caused the device to shut off the current to the appliance. After the ground fault has been corrected, the switch member 56 can be reset manually to contact 58. If the leakage current should be extremely weak, owing to moisture or some other high-resistance short, the amount of current may not be enough to actuate the relay switch 46, but indicator lamp 70 will still light up, showing that there is a small ground fault in the appliance that should be taken into account. Preferably the indicator lamps 62 and 70 are neon glow lamps, which require very little current to light them up.

If there should be a sudden overload in the system, due to a line-to-line short, the increased current passing through the hot line conductors 34, 50, 40, causes the electromagnet coil 48 to be energized sufficiently to close movable contact 64 against stationary contact 66, thereby sending current from hot line 34 through line 68, coil 60, and line 38, to the grounding wire 20 of the electrical service. This lights up the indicator lamp 70 and also energizes electromagnet 60 to move switch member 56 from contact 58 to contact 59, thereby interrupting the hot line circuit to the appliance, and at the same time lighting up lamp 62. Coil 48 and resistor 54 are selected to have the characteristic of closing relay switch 44 only when the current load exceeds the maximum current drawn by the appliance 14 when everything is in good working order. Thus, the momentary surge of current when motor 24 starts up is insufficient to energize the relay 44, but any overload current appreciably in excess of the starting current will cause the relay 44 to close switch member 64 to contact 66, and interrupt the circuit. Relay 44 thus acts in the same manner as a circuit breaker, except that it can be set to interrupt the current at a lower current level than the usual 15 to 20 ampere circuit breaker. When the unit 10 has been triggered by a direct line-to-line short in the appliance 14, this condition is indicated by the fact that both lamps 62 and 70 are lighted up.

Another embodiment of the invention is shown in FIG. 2, wherein parts that correspond to parts already described in connection with FIG. 1 have the same reference numerals as in the latter, but with the prime (') suffix. The unit of FIG. 2 is designated in its entirety by the reference numeral 10', and comprises a housing 32' containing relay switches 72, 74, and 76, which cooperate to perform the same functions as relays 44 and 46 in FIG. 1. Relay switch 72 is a ground fault circuit interrupter having a movable member 78 that is normally closed against a stationary contact 80. Switch member 78 is connected to hot line wire 34' and contact 80 is connected to a conductor 82. An electromagnet coil 84 is serially connected between grounding wire conductors 38' and 42', and is energized by leakage current passing along these conductors from grounding wire 30 on the appliance to 20 in the electrical service. When coil 84 is energized, switch member 78 is pulled away from contact 80, and closed to another contact 85, opening the hot line circuit to the appliance and simultaneously sending current along a wire 87 to grounding conductor 42' and thence through an indicator lamp 89 to neutral conductor 36'. Relay switch 72 thus corresponds to relay switch 46 of FIG. 1, in that they both operate to open the hot line circuit responsive to current passing through the grounding wires of the system. Lamp 89 lights up to show that the unit 10' has been triggered by a ground fault in appliance 14, and corresponds to lamp 62 in FIG. 1.

Relay switch 74 comprises a movable member 86 that is connected to hot line wire 82; stationary contact 88 that is connected to resistor 54'; and electromagnet coil 90 that is serially connected between neutral wire 36' and movable member 92 of relay switch 76. To complete the picture, relay switch 76 has a stationary contact 94 and an electromagnet coil 96, the latter being serially connected between resistor 54' and hot line wire 98. Wire 98 is connected to wire 40' by a fuse 52', and stationary contact 94 is connected to wire 98 by a wire 100. Switch member 92 is normally open with respect to contact 94, but is closed to the latter by electromagnet coil 96 when the excessive overload current surges through the hot line wires as a result of a direct line-to-line short in the appliance. Closing switch contacts 92, 94 sends current from hot line wire 98 to electromagnet coil 90 in relay switch 74, opening contacts 86, 88 and thereby interrupting the hot line circuit to the appliance. Thus, relay switches 74 and 76 cooperate to open the hot line circuit responsive to an excessive current, and are therefore functionally equivalent to the combined relay switches 44 and 46 of FIG. 1. An indicator lamp 101 is connected between hot line 34' and neutral line 36' to indicate that the electrical service 12 is "alive" and that there is current coming into the unit through the lines 34' and 36'.

The mode of operation is essentially the same with the embodiment of FIG. 2 as it is in FIG. 1. Leakage current in the appliance 14 due to a ground fault, energizes relay switch 72 to open the hot line circuit and cause lamp 89 to light up. Overload current due to line-to-line short in the appliance causes relay switch 76 to close member 92 to contact 94, thereby energizing relay switch 74 to open the hot line circuit. In both of the embodiments of FIGS. 1 and 2, the hot line circuit may include a capacitor (not shown) connected in series with the resistor 54 or 54' to provide an impedance that determines the amount of current required to energize the relay (44 or 76) which actuates the circuit interrupter in the hot line circuit responsive to an excessive overload current.

A third form of the invention is shown in FIG. 3. In this embodiment, the ground fault circuit interrupter is designated by the reference numeral 102, and is incorporated in its simplest form into a plug 104 having three prongs 106, 108 and 110 at one end, and sockets 112, 114 and 116 at the other end. Prong 106 and socket 112 are part of the hot line; prong 108 and socket 114 are part of the grounding line; and prong 110 and socket 116 are part of the neutral line. The neutral and grounding lines are connected by a wire 117. Prongs 106, 108 and 110 are adapted to be inserted into any standard three-prong grounding type receptacle (i.e., service line 12), while sockets 112, 114 and 116 are adapted to receive a standard three-prong grounding plug on the extension wire of the appliance 14. The plug body 104 has an interior cavity 118, and contained within this cavity is a relay switch 120 consisting of stationary contacts 122, 123; movable switch member 124; and electromagnet coil 126. Stationary contact 122 is connected to socket 112; movable member 124 is connected to prong 106; and electromagnet coil 126 is connected serially between prong 108 and socket 114. The second stationary contact 123 is connected by a wire 128 to a neon lamp 130, and the lamp circuit is completed by a wire 132 going to the neutral wire connecting prong 110 to socket 116.

Moveable switch member 124 is normally closed to stationary contact 122, thereby closing the hot line circuit to the appliance. Contact 123 is open, and lamp 130 is therefore dark when everything is in good working order. However, leakage current from the appliance frame 22, passing through grounding conductor 30, socket 114, electromagnet coil 126 to prong 108 and finally out through grounding outlet 20, causes the coil 126 to open switch member 124 from contact 122 and close it to contact 123. This interrupts the hot line circuit to the appliance, and causes the lamp 130 to light up. A reset button 134 allows the repairman to reset the switch member 124 so that it is closed to contact 122 when the fault has been repaired.

FIG. 4 shows a similar plug-in circuit interrupter having two prongs 106' and 110' that go into the hot line and neutral line sockets 16 and 18 of a two-prong, ungrounded receptacle. At the other end of the plug are three sockets 112', 114' and 116', to receive the three-pronged plug of the grounded appliance 14. In this case, movable switch member 124' is connected to prong 106', and stationary contact 122' is connected to socket 112'. Electromagnet coil 126' is connected at one end to grounding socket 114', and at the other end by a wire 134 to neutral prong 110'. Contact 123' is connected by a wire 135 to a neon lamp 130', and the circuit of lamp 130' is completed by wire 132' to prong 110'. Leakage current from the appliance frame 22 passes through grounding wire 30, socket 114', electromagnet coil 126', wire 134, and out through neutral prong 110' to neutral side 18 of the electrical outlet. This opens switch member 124 from contact 122' and closes it to contact 123', thereby opening the hot line circuit to the appliance and simultaneously lighting up lamp 130'. A reset button 134' allows the contact 124' to be reset after having been opened.

FIGS. 5 and 6 show two plug-in models of the invention in its simplest form. FIG. 5 is a three-socket and three-prong plug, while FIG. 6 is a three-socket and two-prong adapter plug, for use in connecting a grounded appliance to a non-grounding receptacle. In each case, the unit is a warning device to let a repairman know that there is a ground fault, without actually interrupting the circuit. In FIG. 5, a warning neon lamp 136 is serially connected between grounding socket 114'' and grounding prong 108''. Sockets 112'' and 116'' are connected directly to their respective prongs 106'' and 110''. Leakage current due to a ground fault in the appliance 14 causes the lamp 136 to light up, warning the repairman that the appliance frame is electrically connected to the hot line, and suitable steps should be taken before proceeding further.

In FIG. 6, the two prongs 106''' and 110''' are connected to the hot line and neutral socket 112''' and 116''', respectively. Grounding socket 114''' is connected to indicator lamp 136', which is also connected to prong 110'''. Indicator lamp 136'' is lighted up by leakage current from the appliance frame 22 through conductor 30, socket 114''', lamp 136', prong 110''', to the neutral side of the electrical outlet.

While I have shown and described in considerable detail several illustrative forms of my invention, it will be understood by those skilled in the art that the invention is not limited to such details, but might take various other forms. The invention works equally well with either a.c. or d.c. current, and may be used with any voltage. Moreover, it is not limited to three-prong grounding plugs and receptacles, but might be used in any circuit (such as an automobile, for example) having a hot line and return line from the electrical source to a grounded-frame appliance or motor, wherein the frame of the appliance is connected by a suitable conductor to the return line. Thus, the device of the invention will detect any current leakage from the hot line to the grounded frame of the appliance, and such leakage current is utilized to interrupt the hot line circuit to the appliance, so as to cut it off from the source of electricity and thereby eliminate any chance of injury or damage due to short circuit.

I claim:

1. A device for use with an electrical appliance having a grounded frame and including an electrical connection having a hot wire, neutral wire, and a grounding wire connected to said frame, said electrical connection being connected to an electrical service consisting of a hot conductor, a neutral conductor, and a grounding conductor, said device comprising:
 a hot line connecting said hot conductor of said electrical service to said hot wire of said appliance electrical connection;
 a neutral line connecting said neutral conductor of said electrical service to said neutral wire of said appliance electrical connection;
 a grounding line connected to said grounding wire of said appliance electrical connection and to said grounding conductor of said electrical service;
 current-flow-interrupting means serially connected to said grounding line for opening the hot line responsive to the flow of leakage current along the grounding line due to the existence of a ground fault in said appliance;
 said current-flow-interrupting means comprising a normally-closed relay switch in said hot line, said relay switch being opened by an electromagnet serially connected between said grounding line and said grounding conductor of said electrical service.

2. A device for use with an electrical appliance having a grounded frame and including an electrical connection having a hot wire, neutral wire, and a grounding wire connected to said frame, said electrical connection being connected to an electrical service consisting of a hot conductor and at least one return conductor means, said device comprising:
 a hot line connecting said hot conductor of said electrical service to said hot wire of said appliance electrical connection;
 a neutral line connecting said return conductor means of said electrical service to said neutral wire of said appliance electrical connection;
 a grounding line connected to said grounding wire of said appliance electrical connection and to said return conductor means of said electrical service;
 current-flow-detecting means serially connected to said grounding line for detecting the flow of leakage along the grounding line due to the existence of an electrical path from said hot wire to said appliance frame;
 said current-flow-detecting means including a relay switch actuated by the flow of leakage current along said grounding line to open the circuit of said hot line, thereby interrupting the flow of current along said hot line to said appliance; and
 means actuated by an excessive overload current flow through said hot line to energize said relay switch.

3. A device as in claim 2, wherein the last-named means comprises a second relay switch having normally open contacts connected to said hot line and to said first-named relay switch, respectively, said second relay switch being operable to close said normally open contacts and thereby send current from said hot line to said first-named relay switch, so as to actuate the latter and open the hot line to said appliance.

* * * * *